Dec. 21, 1926.  1,611,271
H. W. HAMMOND ET AL
TENT PULLER
Filed Sept. 5, 1923  2 Sheets-Sheet 1
Fig. 1,
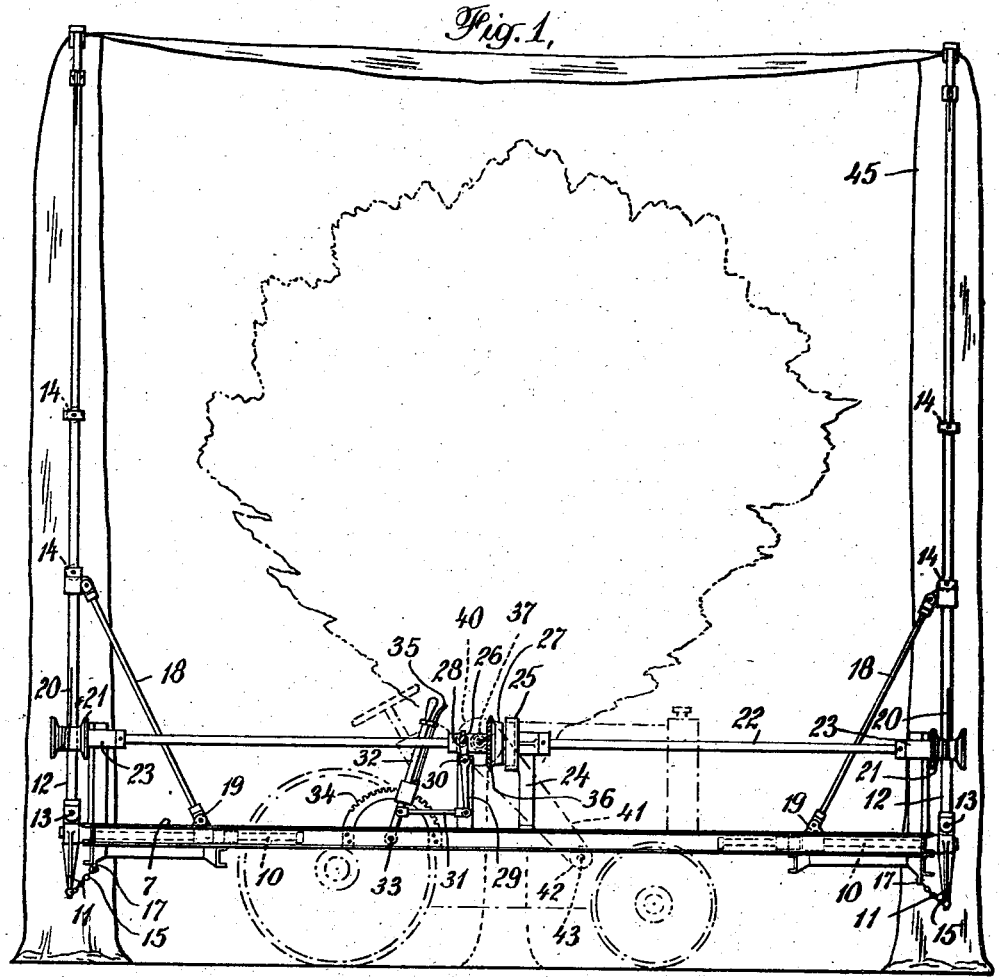
Fig. 3,
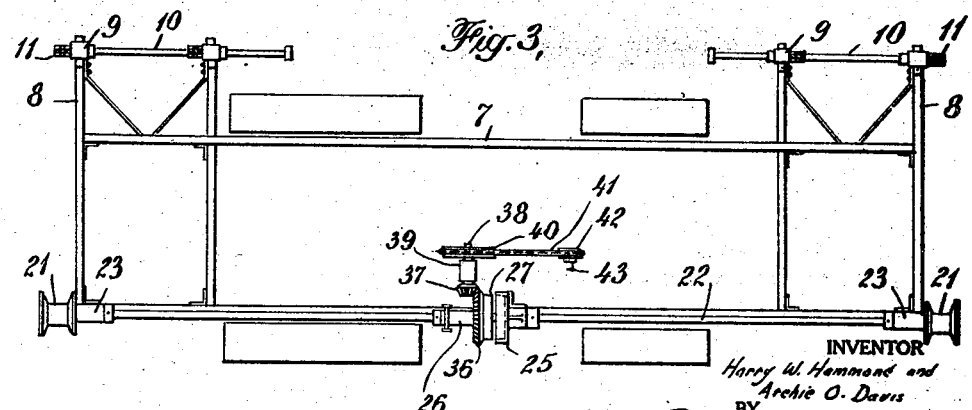
INVENTOR
Harry W. Hammond and
Archie O. Davis
BY
their ATTORNEYS Dec. 21, 1926. 1,611,271
H. W. HAMMOND ET AL
TENT PULLER
Filed Sept. 5, 1923 2 Sheets-Sheet 2

INVENTOR
Harry W. Hammond
and Archie O. Davis
BY
their ATTORNEYS

Patented Dec. 21, 1926.

1,611,271

UNITED STATES PATENT OFFICE.

HARRY W. HAMMOND AND ARCHIE O. DAVIS, OF HIGHLAND, CALIFORNIA ASSIGNORS, BY MESNE ASSIGNMENTS, TO CALIFORNIA CYANIDE COMPANY, INC., A CORPORATION OF DELAWARE.

TENT PULLER.

Application filed September 5, 1923. Serial No. 661,004.

This invention relates to fumigation, and particularly to the treatment of trees and other vegetation with lethal gases. This treatment is carried out by enclosing the tree in a tent or other covering of canvas or the like which limits the space in which the lethal gas is effective. Heretofore the tents, which ordinarily are octagonal sheets, have been pulled over the trees by means of poles having ropes attached thereto so that the operator can pull the poles into upright position and thus raise the edge of the tent over the top of the tree. This procedure is extremely laborious, particularly when the trees are large enough to require tents fifty feet or more in size.

It is the object of the present invention to provide an apparatus whereby the tents may be rapidly and efficiently handled and applied to the trees without injury thereto.

A further object of the invention is the provision of a self-contained and self-propelling apparatus whereby the tents may be lifted and placed by mechanical power.

Further objects and advantages of the invention will be apparent as it is better understood by reference to the following specification and accompanying drawing, in which Fig. 1 is a side elevation of the apparatus illustrating the application of a tent to a tree;

Fig. 3 is a plan view of the apparatus; and

Figure 2:
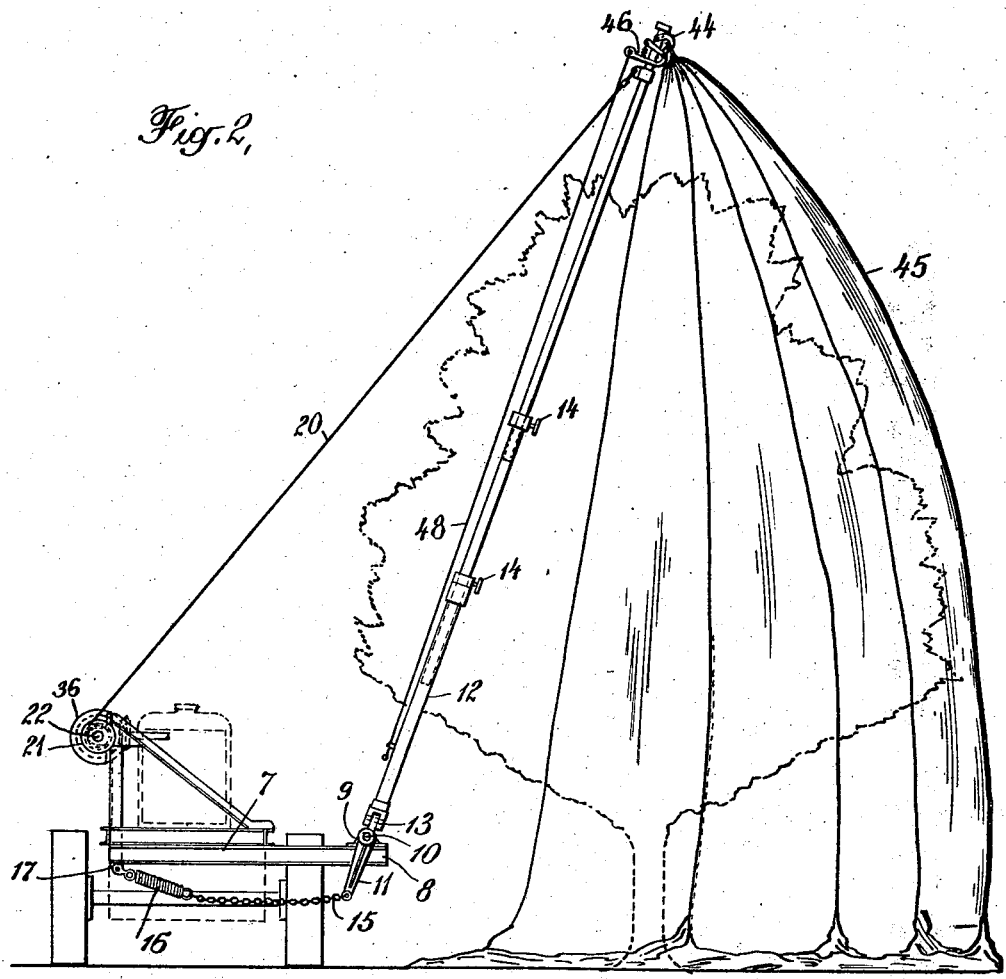
Fig. 2 is an end elevation similarly illustrating the operation.
Figure 4:
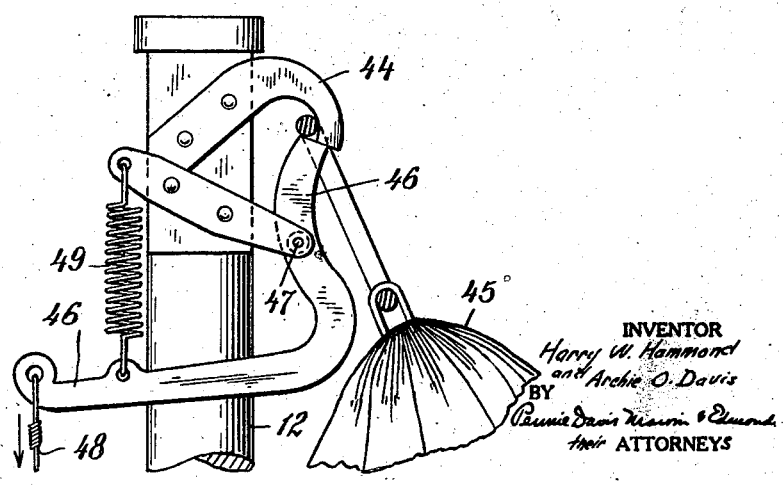
Fig. 4 is a detail in elevation of a tent hook.

In carrying out the invention we employ a tractor or self-propelled vehicle of any suitable design and construction. Preferably the tractor is provided with an internal combustion engine which furnishes power both for propelling the vehicle and for actuating the tent-placing apparatus.

This apparatus is mounted on the tractor and is connected in any suitable manner to the engine so that the apparatus may be operated when the tractor is standing. The apparatus comprises a pair of arms which are preferably extensible and are of sufficient length to lift the tent over the highest tree to be fumigated. The arms are pivoted upon the frame of the apparatus and are also hingedly connected thereto so that they may be folded longitudinally along the frame when the tractor is moving. To permit manipulation of the arms their upper ends are connected to cables passing over winding drums which are in turn actuated through a shaft from the engine, suitable controlling means being interposed whereby the arms may be raised or lowered as desired. As the tents vary in size the lifting arms are preferably adjustable with reference to each other and may be spaced apart in accordance with the size of the tent.

Referring to the drawing 5 indicates the tractor body which is mounted on wheels 6 and encloses a suitable engine (not shown) which is the source of power. The usual mechanism (not shown) for transmitting power to the driving wheels of the tractor and for controlling the movements thereof are provided. These elements, however, form no part of the present invention.

A frame 7, generally rectangular in form and of sufficient strength to resist the stresses to which it is subjected, is mounted on the tractor body. At one side the frame is provided with extensions 8 carrying bearings 9 in which the pivot shafts 10 are mounted. These pivot shafts are longitudinally movable in the bearings and may be held in any desired position by suitable clamping devices provided therefor.

Levers 11 are pivotally mounted on the ends of the shafts 10 and tent-carrying arms 12 are hingedly connected at 13 to the levers. The arms preferably consist of tubular telescoping sections which may be adjusted with reference to each other and held by set screws 14, thus permitting variation of the length of the arms. The lower ends of the levers 11 are connected by chains 15 and springs 16 to brackets 17 on the lower side of the frame, the purpose of this connection being to resiliently limit the movement of the arms when the tent is lifted. Braces 18 are secured to the arms 12 to hold the arms in proper relative position. The lower ends of the braces are secured to collars 19 on the pivot shafts 10 and may be disconnected therefrom to permit folding of the arms on the hinges 13.

The upper ends of the arms 12 are connected by cables 20 to drums 21 which are secured to a shaft 22 mounted in bearings 23 in the frame and extending longitudinally thereof. About midway of the frame the shaft passes through a bracket 24 carrying a stationary brake clutch 25. A collar 26 is splined to the shaft and carries a co-operating clutch member 27. The collar is engaged by a fork 28 on a lever 29 which is pivoted at 30 on the frame. The lower end of the lever is connected by a link 31 to a hand-lever 32 which is likewise pivoted at 33 on the frame. A quadrant 34 is secured to the frame and is adapted to cooperate with a locking device 35 whereby the latter is held in any desired position.

A gear 36 is mounted on the collar 26 and is adapted to mesh with a pinion 37 on a stub shaft 38 which is supported in a bearing 39 on the frame. The opposite end of the shaft carries a sprocket 40 which is connected by a chain 41 to a sprocket 42 on a shaft 43 which is driven from the engine. A suitable driving clutch (not shown) is interposed between the engine and the sprocket 42 to permit control of the application of power therethrough. This clutch may be a part of the usual mechanism of the vehicle through which power is transmitted to the driving wheels. When the vehicle is standing with its gear-shifting mechanism (not shown) in neutral position power is transmitted through the sprocket 42 to the gear 36 if the latter is meshed with the pinion 37. When the vehicle is running the gear 36 and pinion 37 are not meshed.

At their upper ends the arms 12 are provided with hooks 44 to receive the rings which are secured to the edges of the tent 45. The hooks are provided with locking levers 46 pivoted at 47 thereon and having wires 48 connected thereto and leading to a point adjacent the driver's seat so that the rings may be released after the tent has been pulled over the tree. Normally the locking levers are held in closed position by springs 49.

In utilizing the apparatus the tractor is driven under its own power to a point at one side of the tree to be covered. The arms 12 are swung outwardly on their hinges and the braces 18 are secured in position to hold the arms in proper relation. The rings in the edge of the tent are connected to the hooks 44 and the hand lever 32 is actuated to cause the gear 36 to mesh with the pinion 37. When the driving clutch is engaged the shaft 22 will be rotated under the actuation of the engine to lift the arms 12 and carry the tent upwardly over the tree, the cables 20 being wound upon the drums 21. This operation is continued to a sufficient point to tension the springs 16, which are capable of slipping the driving clutch and arresting the movement of the arms. In this position the arms 12 will be swung beyond the vertical position toward the opposite side of the tractor from the tree, thus ensuring that the edge of the tent is drawn over the tree to a sufficient extent to permit it to fall in proper position. The hand lever is then actuated to disengage the gear 36 from its pinion 37 and to cause the clutch member 27 to engage the braking clutch 25. Upon releasing the gear 36 the springs 16 will cause the arms to move backward to a slight extent and the wires 48 are then pulled to release the rings from the hooks 44 so that the tent will fall over the tree.

The tractor is then moved to a position adjacent the next tree and the hand lever 32 is shifted slightly to permit the arms 12 to fall under their own weight to the ground so that another tent can be connected. The arms move always under control of the engine or of the braking clutch 25 and consequently can be operated by the driver of the tractor while he is seated thereon. It is only necessary to provide another operator to secure the tent rings to the hooks and to otherwise adjust the tents while the tractor is moving to the next tree.

The apparatus described provides highly efficient means for handling and placing tents over trees for fumigation purposes. It is relatively simple in construction, is easily maintained in operative condition and saves a vast amount of labor in the handling of tents.

Various changes may be made in the form and details of construction of the parts without departing from the invention or sacrificing any of the advantages thereof.

We claim:—

1. In an apparatus for placing tents over trees in preparation for fumigation, the combination of a self-propelled vehicle having power means thereon, arms pivotally supported on the vehicle, means on the arms to hold a tent, means adapted to be actuated by the power means to lift the arms and thereby raise the tent, means for controlling the descent of the arms and means permitting variation of the distance between the arms.

2. In an apparatus for placing tents over trees in preparation for fumigation, the combination of a self-propelled vehicle having power means thereon, arms pivotally supported on the vehicle, means on the arms to hold a tent, means adapted to be actuated by the power means to lift the arms and thereby raise the tent, means for controlling the descent of the arms and means for resiliently limiting the tent-lifting movement of the arms.

3. In an apparatus for placing tents over trees in preparation for fumigation, the combination of a self-propelled vehicle having power means thereon, arms pivotally supported on the vehicle, a releasable catch on each arm to hold the tent, means adapted to be actuated by the power means to lift the arms and thereby raise the tent, means for releasing said catches to free the tent from the arms and from the releasing means, and means for controlling the descent of the arms.

4. In an apparatus for placing tents over trees in preparation for fumigation, the combination of a self-propelled vehicle having power means thereon, arms pivotally supported on the vehicle so as to pass beyond the vertical position toward the opposite side of the apparatus from the tree, a releasable catch on each arm to hold the tent, means adapted to be actuated by the power means to lift the arms, thereby raising the tent and carrying the arms to said position beyond the vertical, means for resiliently limiting this movement of the arms, means for releasing said catches to free the tent from the arms, and means for controlling the descent of the arms.

In testimony whereof we affix our signatures.

HARRY W. HAMMOND.
ARCHIE O. DAVIS.